US010846373B2

(12) United States Patent
Toueg

(10) Patent No.: US 10,846,373 B2
(45) Date of Patent: Nov. 24, 2020

(54) METHOD AND SYSTEM FOR SECURING A CLIENT'S ACCESS TO A DRM AGENT'S SERVICES FOR A VIDEO PLAYER

(71) Applicant: ORCA INTERACTIVE LTD, Ra'anana (IL)

(72) Inventor: Yaacov Toueg, Ra'anana (IL)

(73) Assignee: ORCA INTERACTIVE LTD, Ra'Anana (IL)

( * ) Notice: Subject to any disclaimer, the term of this patent is extended or adjusted under 35 U.S.C. 154(b) by 356 days.

(21) Appl. No.: 15/780,713

(22) PCT Filed: Dec. 3, 2015

(86) PCT No.: PCT/IL2015/051177
§ 371 (c)(1),
(2) Date: Jun. 1, 2018

(87) PCT Pub. No.: WO2017/093990
PCT Pub. Date: Jun. 8, 2017

(65) Prior Publication Data
US 2018/0365389 A1 Dec. 20, 2018

(51) Int. Cl.
*G06F 21/10* (2013.01)
*H04L 9/06* (2006.01)
*H04L 29/06* (2006.01)

(52) U.S. Cl.
CPC .......... *G06F 21/10* (2013.01); *H04L 9/0643* (2013.01); *H04L 63/0807* (2013.01); *H04L 63/10* (2013.01); *H04L 2463/101* (2013.01)

(58) Field of Classification Search
CPC ... G06F 21/10; H04L 9/0643; H04L 63/0807; H04L 63/10; H04L 2463/101
See application file for complete search history.

(56) References Cited

U.S. PATENT DOCUMENTS

| 9,027,143 B1 | 5/2015 | Agrawal et al. |
| 2009/0016514 A1 | 1/2009 | Miller et al. |

(Continued)

FOREIGN PATENT DOCUMENTS

| EP | 1942430 A1 | 7/2008 |
| WO | 200058810 A2 | 10/2000 |

(Continued)

*Primary Examiner* — Huan V Doan
(74) *Attorney, Agent, or Firm* — Browdy and Neimark, P.L.L.C.

(57) ABSTRACT

The present invention provides a method for securing a client's access to a DRM agent's services. The method comprising, by the DRM agent, the steps of: receiving a get-token request, applying a function to generate a decryption request identifier Request ID and a token value Token, returning Request ID and Token to the client, inserting, into a hash table of token values with get-token requests identifiers as keys, a record comprising the token value Token associated to the key Request ID, receiving a decryption request comprising Request ID, a multimedia content encrypted chunk and a digest of the encrypted chunk, retrieve Token from hash table based on Request ID, processing digest using a public key and Token, checking match between the processed digest and the at least part of the encrypted chunk and, only in case of match: decrypting the encrypted chunk and returning the decrypted chunk to the client.

15 Claims, 6 Drawing Sheets

(56) References Cited

U.S. PATENT DOCUMENTS

| | | | |
|---|---|---|---|
| 2010/0211793 A1* | 8/2010 | Park, II | H04N 21/6175 713/176 |
| 2013/0173923 A1* | 7/2013 | Qiu | H04L 9/3247 713/176 |

FOREIGN PATENT DOCUMENTS

| | | |
|---|---|---|
| WO | 200707736 A1 | 1/2007 |
| WO | 2011041916 A1 | 4/2011 |

\* cited by examiner

METHOD AND SYSTEM FOR SECURING A CLIENT'S ACCESS TO A DRM AGENT'S SERVICES FOR A VIDEO PLAYER

1. TECHNICAL FIELD

The present invention relates to the field of securing a client's access to a DRM agent's services and more particularly of securing a client's access to a DRM agent's services service of a video player.

2. RELATED ART

One known solution of Adobe, is described in patent document numbered U.S. Pat. No. 9,027,143 which discloses a process of the authentication of a video player (called Runtime Component) by a CA-DRM agent. This process includes receiving encrypted content and a given authentication component from a remote computer system. The authentication component may be configured to authenticate a runtime component by decrypting at least a portion of the encrypted content. In this way, the client system may ensure that decryption of the encrypted content may occur only if multiple components authenticate the runtime component, according to some embodiments.

Another solution is proposed by Trusted Logic in patent application No. US2009165148. This invention relates to a method for authenticating applications of a computer system including: a microprocessor, a plurality of applications, a general operating system (OS2) which can execute and manage the applications and which can associate each application identifier (3) with the identification information required for the execution thereof, and a trusted environment (EC) which offers services to said applications. According to the invention, before the services of the trusted environment (EC) can be accessed by an application, a hashing operation is performed on the identification information of said application and the trusted environment (EC) checks the authenticity of the result of the hashing operation.

International application WO2007077362 disclose an OS service to authenticate the applications and libraries. The invention relates to a method for authenticating applications of a computer system including: a microprocessor, a plurality of applications, a general operating system (OS2) which can execute and manage the applications and which can associate each application identifier (3) with the identification information required for the execution thereof, and a trusted environment (EC) which offers services to said applications. According to the invention, before the services of the trusted environment (EC) can be accessed by an application, a hashing operation is performed on the identification information of said application and the trusted environment (EC) checks the authenticity of the result of the hashing operation.

The present invention provides a method for securing a client's computerized module access to a DRM agent's services.

The method comprising the steps of:
Sending, by the client, a get-token request to the DRM agent;
Applying the following steps by the DRM agent:
a. Receiving the get-token request;
b. applying a function to generate a decryption request identifier RequestID and a token value Token, and returning RequestID and Token to the client;
c. inserting, into a hash table of token values with get-token requests identifiers as keys, recorded in a memory of the DRM agent, a record comprising the token value Token associated to the key RequestID;
applying the following steps by the client:
d. receiving RequestID and Token from the DRM agent;
e. computing a digest of a multimedia content encrypted chunk using Token and a private key;
f. computing a decryption request of the multimedia content encrypted chunk, comprising RequestID, the encrypted chunk and the digest of the encrypted chunk;
g. sending to the DRM agent, the decryption request of the encrypted chunk;
and applying the following steps By the DRM agent:
h. receiving, the decryption request;
i. retrieving Token, from the hash table, based on RequestID;
j. processing the digest using a public key and Token;
k. checking match between processed digest and at least part of the encrypted chunk;
l. only in case of match: decrypting encrypted chunk and returning the decrypted chunk to the client;
   i. wherein at least one of receiving, processing, computing decrypting are performed by a processor.

According to some embodiments of the invention the following are applied:
the get-token request comprises an identifier ClientID of the client;
the function uses ClientID as an input;
the hash table's record further includes ClientID associated with the key RequestID;
the decryption request further comprises an identifier ClientID2 of the client;
the retrieving of Token is jointly performed with the retrieving of ClientID, and the subsequent processing of the digest and encrypted chunk decryption are only performed in case of match between ClientID and ClientID2.

According to some embodiments of the invention the checking match between processed digest and at least part of the encrypted chunk includes performing a XOR operation between the Token and the at least part of the encrypted chunk.

According to some embodiments of the invention in case of no match, the client application is terminated.

According to some embodiments of the invention the method further comprising the step of removing the record comprising the token value Token associated to the key RequestID from the hash table after the decryption request is handled.

According to some embodiments of the invention the hash table management process, and the communication process with the client are protected in terms of mutual exclusion inside the DRM agent, in order to prevent the client to gain access to the hash table.

According to some embodiments of the invention the method further using multiple public keys as a whitelist of authorized clients to support multiple client sources.

The present provides a method for securing a client's computerized module access to a DRM agent's services. The method comprising the steps of:
receiving the get-token request from the client;
applying a function to generate a decryption request identifier RequestID and a token value Token, and returning RequestID and Token to the client;
inserting, into a hash table of token values with get-token requests identifiers as keys, recorded in a memory of the DRM agent, a record comprising the token value Token associated to the key Request ID;

receiving, the decryption request of a multimedia content encrypted chunk, comprising RequestID, the encrypted chunk and a digest of the encrypted chunk;

retrieving Token, from the hash table, based on RequestID;

processing the digest using a public key and Token;

checking match between processed digest and at least part of the encrypted chunk; only in case of match: decrypt encrypted chunk and return the decrypted chunk to the client.

Wherein at least one of receiving, processing, computing decrypting are perfumed by a processor.

The present provides a method a system for securing a client's access to a DRM agent's services, said system being comprised of:

a client algorithm module for receiving RequestID and Token from the DRM agent, computing a digest of a multimedia content encrypted chunk using Token and a private key, computing a decryption request of the multimedia content encrypted chunk, comprising RequestID, the encrypted chunk and the digest of the encrypted chunk and sending to the DRM agent, the decryption request of the encrypted chunk;

a get-token request handling module for receiving a get-token request, applying a function to generate a decryption request identifier RequestID and a token value Token, returning RequestID and Token to the client, and inserting, into a hash table of token values with get-token requests identifiers as keys, a record comprising the token value Token associated to the key RequestID;

a decryption request handling module for receiving a decryption request of a multimedia content encrypted chunk comprising RequestID, the encrypted chunk and a digest of the encrypted chunk, retrieving Token, from the hash table based on RequestID, processing the digest using a public key and Token, checking match between processed digest and at least part of the encrypted chunk and, only in case of match: decrypting the encrypted chunk and returning the decrypted chunk to the client m. The present provides a method the system:

the get-token request comprises an identifier ClientID of the client;

the function uses ClientID as an input;

the hash table's record further includes ClientID associated with the key RequestID; the decryption request further comprises an identifier ClientID2 of the client.

According to some embodiments of the present invention checking match between processed digest and at least part of encrypted chunk includes performing a XOR operation between Token and the at least part of encrypted chunk.

According to some embodiments of the present invention in case of no match, the client application is terminated.

According to some embodiments of the present invention further comprising means for protecting, in terms of mutual exclusion inside the DRM agent, the hash table management process and the communication process with the client in order to prevent the client to gain access to the hash table.

According to some embodiments of the present invention a decryption requesting method for carrying. The decryption requesting method comprising, performing by the client the steps of:

Sending a get-token request to the DRM agent;

receiving RequestID and Token from the DRM agent;

computing a digest of a multimedia content encrypted chunk using Token and a private key;

computing a decryption request of the multimedia content encrypted chunk, comprising RequestID, the encrypted chunk and the digest of the encrypted chunk;

sending to the DRM agent, the decryption request of the encrypted chunk;

wherein at least one of receiving, processing, computing decrypting are perfumed by a processor.

According to some embodiments of the present invention a client for implementing the decryption requesting method of claim 14, said client being comprised of a signature module for computing a digest of a multimedia content encrypted chunk using Token and a private key.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

In the accompanying drawings.

DETAILED DESCRIPTION

Figure 1:
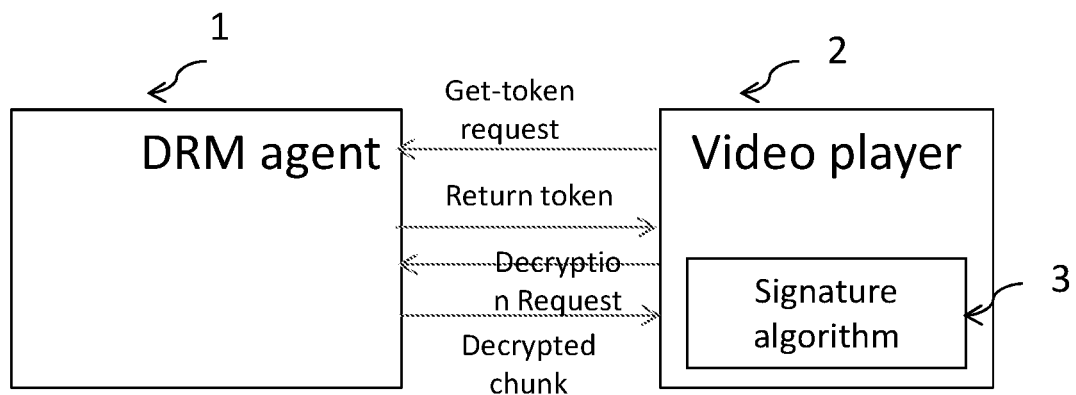
FIG. 1 is a high level schematic block diagram of the DRM agent with the video player, according to the present invention.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments and liable to be practiced or carried out in various ways. Also, it is to be understood that the phraseology and terminology employed herein is for the purpose of description and should not be regarded as limiting.

Prior to setting forth the background of the related art, it may be helpful to set forth definitions of certain terms that will be used hereinafter.

The goal of the invention is to optimize the resources used to provide this security, and particularly to minimize its CPU footprint, by using minimum CPU memory. Another advantage of the invention is that the invention provides asynchronous client authentication for each multimedia content chunk submitted to the DRM Agent.

FIG. 1 is a high level schematic block diagram of the DRM agent with the video player, according to the present invention. The present invention provides a solution for authenticating the communication of a video player 2, having a signature module 3, with a DRM agent 1.

Figure 2:
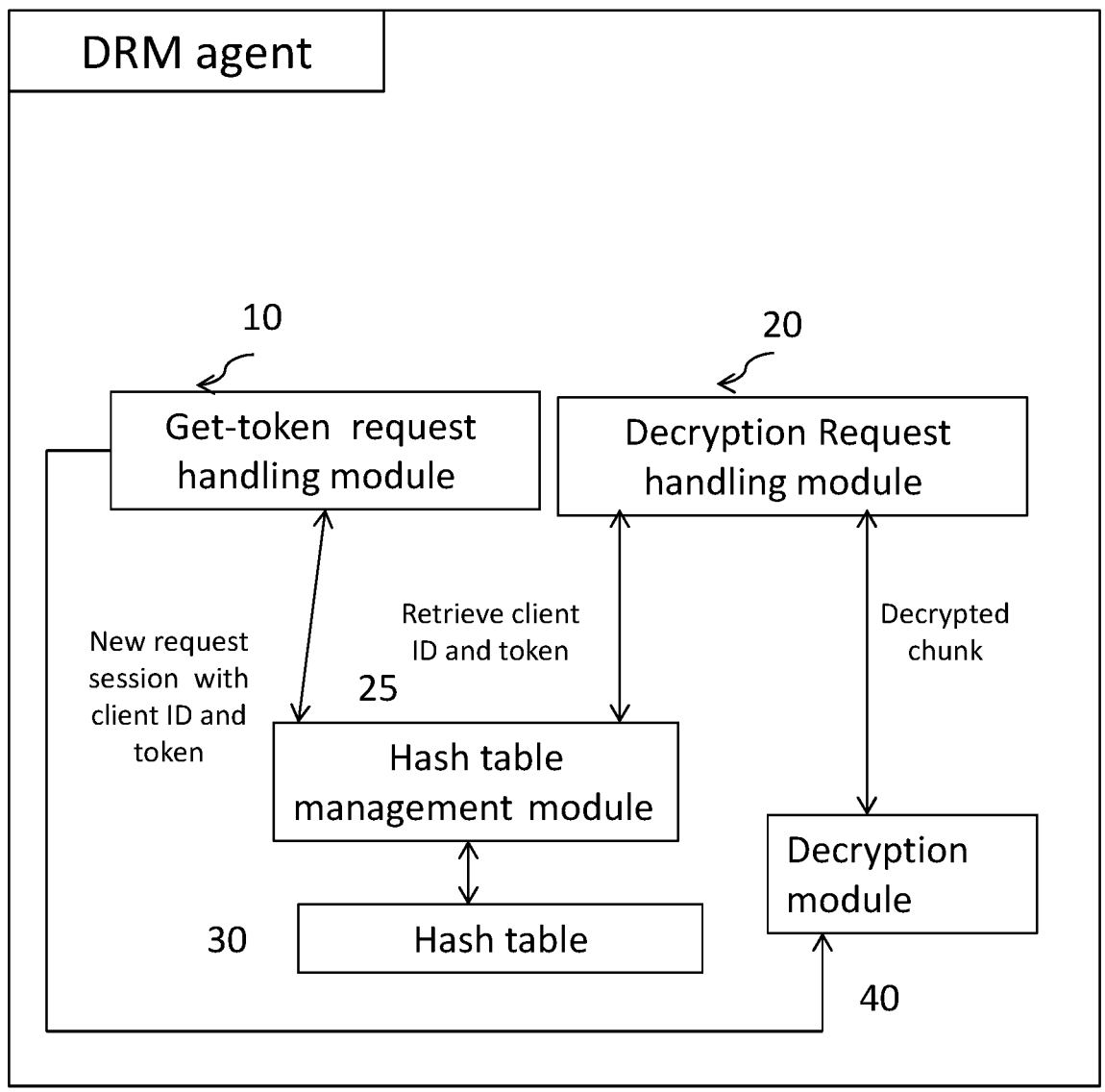
FIG. 2 is a high level schematic block diagram of the DRM agent, according to the present invention.

FIG. 2 is a high level schematic block diagram of the DRM agent, according to the present invention. The DRM agent is comprised of get-token request handling module 10 for handling the get-token requests received from the video player, a decryption request handling module 20 for handling the decryption requests of the video player and providing decrypted content using decryption module 40, and a hash table management module 25 for managing the hash table 30. The decryption module may use any known decryption methods known in the art.

Figure 3:
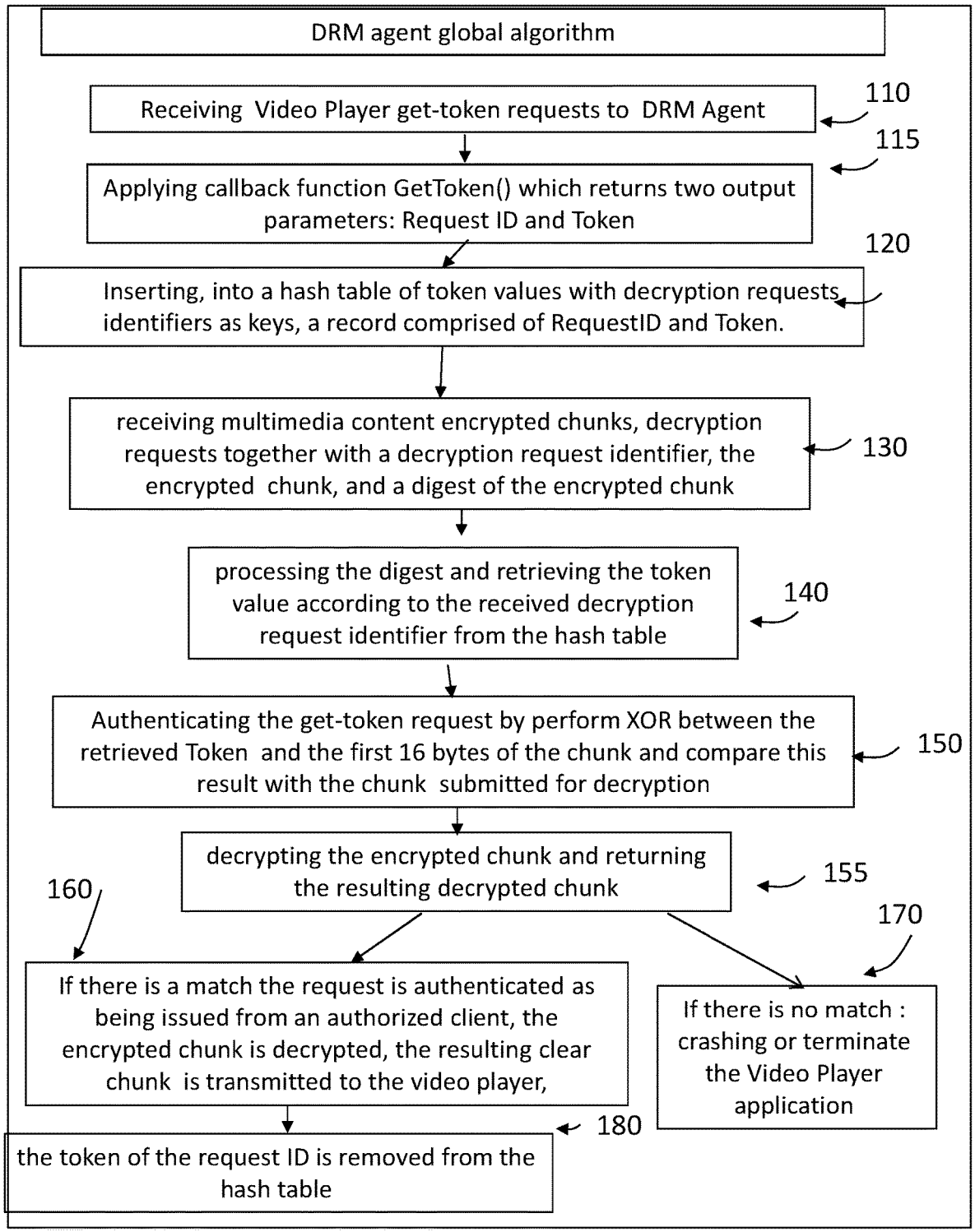
FIG. 3 is a high level flowchart illustrating the DRM agent global algorithm, according to some embodiments of the present invention.

FIG. 3 is a high level flowchart illustrating the DRM agent's global algorithm, according to some embodiments of the present invention. The DRM agent global algorithm performs at least one of the following steps:
  receiving from a video player a get-token request to DRM Agent (step 110), applying a callback function get-token( ) which returns two output parameters: a decryption request identifier RequestID and a token value Token (step 115),
  inserting into a hash table 30 (see FIG. 2) of token values with decryption requests identifiers as keys (step 120), a record comprised of RequestID and Token, receiving multimedia content encrypted chunk decryption request together with a decryption request identifier, the encrypted chunk, and a digest of the encrypted chunk (step 130),
  processing the digest and retrieving the token value according to the received decryption request identifier from the hash table (step 140), and authenticating the decryption request (step 150),
  decrypting the encrypted chunk and returning the resulting decrypted chunk (only if the decryption request was authenticated) (step 155),
  deleting the record comprised of RequestID and Token from the hash table 30.

The hash table is an unordered set of records, each associating, to a decryption request identifier RequestID, a token value Token and a client identifier (ClientID). Maintaining the hash table essentially comprises adding and/or deleting a record to the hash table.

According to some embodiments of the present invention a token value is a strong enough random.

Authenticating the get-token request consists in performing XOR between the retrieved token value Token and the first 16 bytes of the chunk and comparing the obtained result with the encrypted chunk submitted for decryption (step 150). If there is a match the request is authenticated as being issued from an authorized client, the encrypted chunk is decrypted, the resulting clear chunk is transmitted to the video player (step 160) and the record comprising RequestID and Token is removed from the hash table. If there is no match, the video player application is crashed or terminated (step 170), and no decryption of the chunk is needed.

Figure 4:
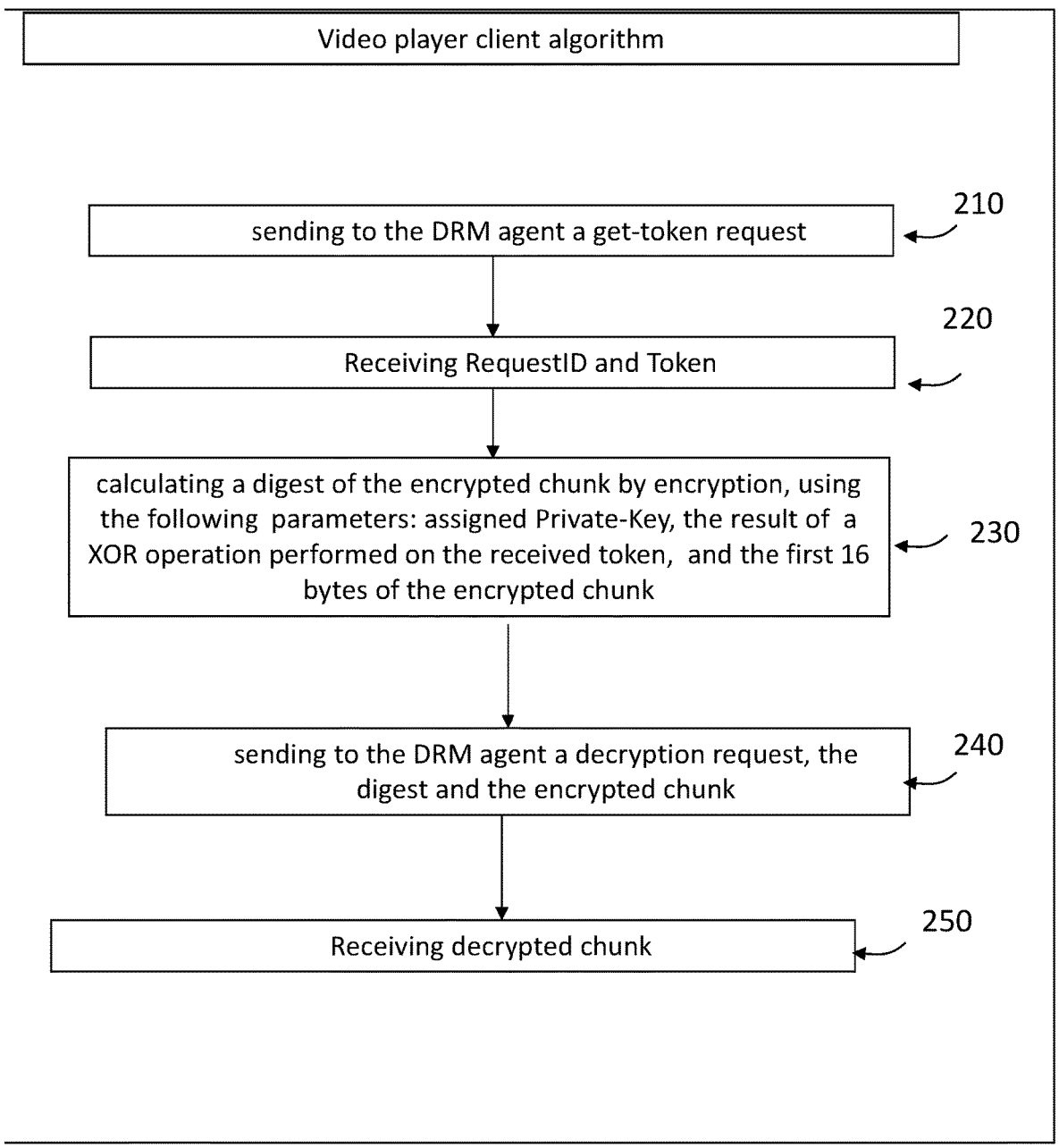
FIG. 4 is a high level flowchart illustrating of the client algorithm implemented by the video player, according to some embodiments of the present invention.

FIG. 4 is a high level flowchart illustrating the algorithm of the video player, according to some embodiments of the present invention.

Preliminarily, the video player is assigned a private and public keys pair in a public key infrastructure. The private key is only recorded by the signature module. The public key is publidy available and so is the DRM agent.

The video player performs at least one of the following steps: sending to the DRM agent a get-token request, receiving in response the decryption request identifier RequestID and the token value Token, calculating, by means of the signature module, a digest of the encrypted chunk by encryption, using the following parameters: Private-Key, the result of a XOR operation performed on the received token value and the first 16 bytes of the encrypted chunk (In case the encrypted chunk is shorter than 16 bytes it is to be padded with zeros) (210); once the digest is calculated, sending to the DRM agent a decryption request, the digest and the encrypted chunk (220). At the end of the process the decrypted chunk is received from the DRM agent (230).

Figure 5:
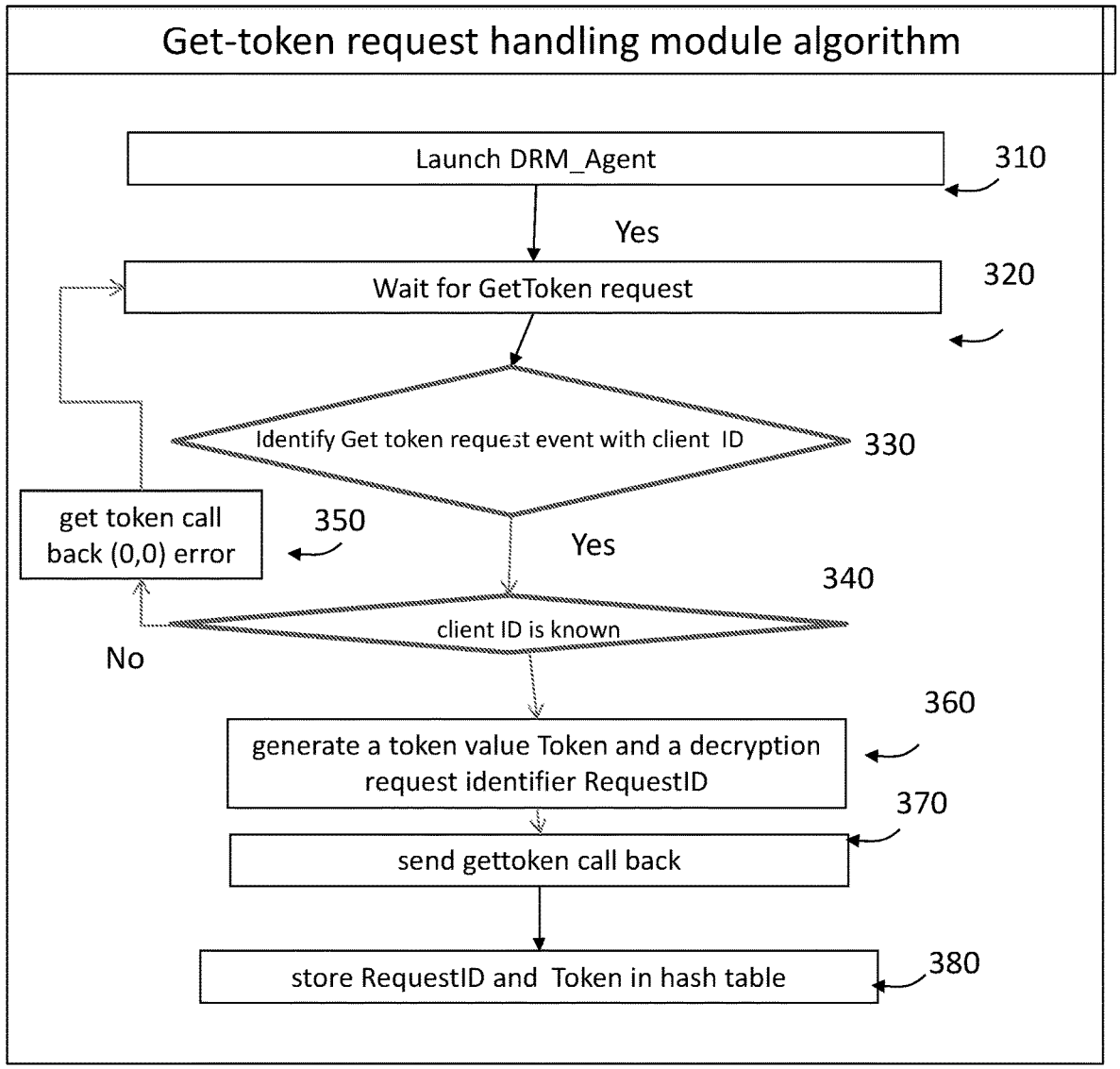
FIG. 5 is a high level flowchart illustrating Get-token request handling module algorithm, according to some embodiments of the present invention.

FIG. 5 is a high level flowchart illustrating get-token request handling module algorithm, according to some embodiments of the present invention. The get-token request handling module algorithm, include at least one of the following steps: launch DRM Agent (310), wait for get-token request 320, identify get-token request event with client identifier ClientID (step 330). if ClientID is known by the DRM agent (step 340), generate a token value Token and a decryption request identifier RequestID (step 360), send get-token call back (RequestID, Token) (step 370) and store RequestID, ClientID and Token in hash table (step 380). If ClientID is unknown by the DRM agent, send a get-token call back (0,0) error (step 350). In case only one client is expected, the client identifier ClientID is not needed.

Figure 6:
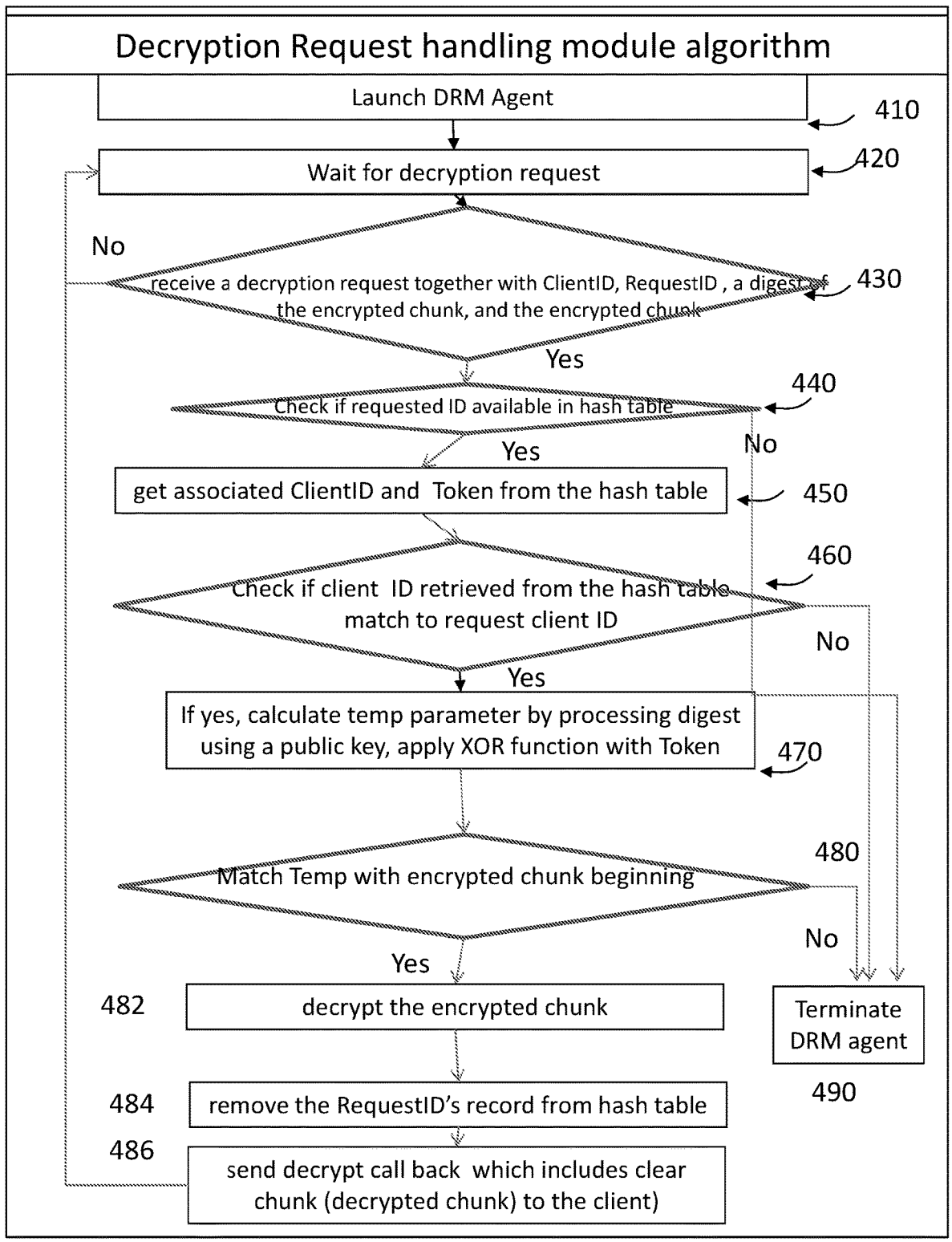
FIG. 6 is a high level flowchart illustrating Decryption request handling module, according to some embodiments of the present invention.

FIG. 6 is a high level flowchart illustrating decryption request handling module algorithm, according to some embodiments of the present invention. The decryption Request handling module algorithm includes the following steps:
  Launch DRM Agent (step 410) and wait for decryption request (step 420),
  receive a decryption request together with ClientID, RequestID, a digest of the encrypted chunk, and the encrypted chunk (step 430), and check if RequestID is available in the hash table (step 440). If yes, get associated ClientID and Token from the hash table (step 450), and then check if ClientID retrieved from the hash table match to ClientID received with the request (step 460). If yes, calculate temp parameter Temp by processing digest using a public key, applying XOR function with Token (step 470) and then match Temp with encrypted chunk beginning (step 480). In case of match perform the following operations: decrypt the encrypted chunk (step 482) in order to obtain the clear chunk, remove the RequestID's record from hash table (step 484) and send decrypt call back which includes clear chunk (decrypted chunk) to the client. In case of no match, terminate DRM agent (step 490) without decrypting the (encrypted) chunk.

According to some embodiments of the present invention, the client device is not a video player, but another kind of device. For example, the client device is a video decoder, or is another kind of multimedia player such an audio player.

According to some embodiments of the present invention, an ordinary function is used instead of a callback function.

According to some embodiments of the present invention, the hash table management process inside DRM agent and video player communication to DRM agent are protected in terms of mutual exclusion, in order to prevent the video player to gain access to the hash table. This protection aims to ensure these concurrent processes are not executed simultaneously. A number of hardware and software solutions can be used for securing the communication and processing of the hash table which are known in the field of concurrency control. Hardware solutions examples are: interrupts disabling and busy-waiting. Among software solutions, a number of algorithms also rely upon busy-waiting, while others use operating systems synchronization facilities. (See for example https://en.wikipedia.org/wiki/Mutual_exclusion#cite_note-6 for more information regarding this topic.)

According to some embodiments of the present invention the video player calls, which are submitted during playback each time a chunk of encrypted multimedia content has been received or read by the video player, and has to be processed by the video player, appear in pairs: the get-token request will be submitted first, and then the chunk decryption request.

According to some embodiments of the present invention a decryption request identifier RequestID is a simple integer count number. It also may be any other kind of fixed value number or character string, for example randomly computed.

According to some embodiments of the present invention the token generated is a strong enough random, computed by means of a pseudorandom number generator.

According to some embodiments of the present invention, it supports multiple video players sources by using multiple public keys as a whitelist of authorized video players.

According to some embodiments of the present invention, the 16 bytes of the encrypted chunk used to calculate its digest are not the first 16 ones. For example they are the last 16 ones. In another example, the 16 bytes used of the encrypted chunk used to calculate its digest, are not consecutive bytes.

According to some embodiments of the present invention, an index based on the token is used to select the 16 bytes inside the video chunk submitted for decryption. For example, if a given weight bit of the token has value 0, respectively 1, then the first, respectively last, 16 bytes are used.

According to some embodiments of the present invention, an index each bit of which corresponds to a byte of an encrypted chunk is used in a similar way: depending on each of the index's bit value, the corresponding byte of the encrypted chunk is taken into account or not. For example the index is pseudo-randomly calculated. In another example, the index is renewed with a predetermined frequency.

According to some embodiments of the present invention, another number of bytes of the encrypted chunk is used to calculate its digest. For example, 8 or 32 bytes are used.

According to some embodiments of the invention, in case the encrypted chunk is shorter than 16 bytes it is to be padded with ones, or by another predetermined sequence of bit values.

According to some embodiments of the present invention, it is suggested to define a windows size limit, to limit the number of simultaneous pending requests for chunk decryption.

According to some embodiments of the present invention, it is suggested to add a whitelist of authorized players using the DRM messaging system to support the management of the hash table.

According to some embodiments of the present invention, it is suggested to replace the basic XOR function by any bijective function F(Token, first 16 bytes)/$F^{-1}$(Token, first 16 bytes) such as a symmetric encryption algorithm like Tiny Encryption Algorithm (TEA) using Token as a key The main advantage of this invention is that the used CPU footprint is optimized using minimum CPU memory. Another advantage is the system according to the present invention, provides asynchronous client authentication for each chunk submitted to the DRM Agent.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

What is claimed is:

1. A method for securing a client's computerized module access to a Digital Rights Management (DRM) agent's services, said method comprising the steps of:
    sending, by the client, a get-token request to the DRM agent;
    applying the following steps by the DRM agent:
        receiving the get-token request;
        applying a function to generate a decryption request identifier (RequestID) and a token value (Token), and returning the RequestID and the Token to the client;
        inserting, into a hash table of token values with get-token requests identifiers as keys, recorded in a memory of the DRM agent, a record comprising the Token associated to the RequestID;
    applying the following steps by the client:
        receiving the RequestID and the Token from the DRM agent;
        computing a digest of a multimedia content encrypted chunk using the Token and a private key;
        computing a decryption request of the multimedia content encrypted chunk, wherein the decryption request comprising the RequestID, the encrypted chunk and the digest of the encrypted chunk;
        sending to the DRM agent, the decryption request of the encrypted chunk; and
    applying the following steps by the DRM agent:
        receiving, the decryption request;
        retrieving the Token, from the hash table, based on the RequestID;
        processing the digest using a public key and the Token;
        checking match between processed digest and at least part of the encrypted chunk;
        only in case of match: decrypting encrypted chunk and returning the decrypted chunk to the client;
    wherein at least one of receiving, processing, computing decrypting are performed by a processor.

2. The method of claim 1 wherein:
    the get-token request comprises an identifier ClientID of the client;
    the function uses ClientID as an input;
    the hash table's record further includes ClientID associated with the RequestID;
    the decryption request further comprises an identifier ClientID2 of the client;
    the retrieving of Token is jointly performed with the retrieving of ClientID, and the subsequent processing of the digest and encrypted chunk decryption are only performed in case of match between ClientID and ClientID2.

3. The method of claim 1 wherein checking match between processed digest and at least part of the encrypted chunk includes performing a XOR operation between the Token and the at least part of the encrypted chunk.

4. The method of claim 1 wherein, in case of no match, the client application is terminated.

5. The method of claim 1 further comprising the step of removing the record comprising the Token associated to the RequestID from the hash table after the decryption request is handled.

6. The method of claim 1 wherein the hash table management process, and the communication process with the client are protected in terms of mutual exclusion inside the DRM agent, in order to prevent the client to gain access to the hash table.

7. The method of claim 1 further using multiple public keys as a whitelist of authorized clients to support multiple client sources.

8. The method of claim 1, wherein the client further performs the steps of:
- sending a get-token request to the DRM agent;
- receiving RequestID and Token from the DRM agent;
- computing a digest of a multimedia content encrypted chunk using Token and a private key;
- computing a decryption request of the multimedia content encrypted chunk, comprising RequestID, the encrypted chunk and the digest of the encrypted chunk;
- sending to the DRM agent, the decryption request of the encrypted chunk;
- wherein at least one of receiving, processing, computing decrypting are performed by a processor.

9. The method of claim 8, wherein the client being comprised of a signature module for computing a digest of a multimedia content encrypted chunk using Token and a private key.

10. A method for securing a client's computerized module access to a Digital Rights Management (DRM) agent's services, said method comprising the steps of:
- receiving the get-token request from the client;
- applying a function to generate a decryption request identifier (RequestID) and a token value (Token), and returning the RequestID and the Token to the client;
- inserting, into a hash table of token values with get-token requests identifiers as keys, recorded in a memory of the DRM agent, a record comprising the Token associated to the Request ID;
- receiving, a decryption request of a multimedia content encrypted chunk, wherein the decryption request comprising the RequestID, the encrypted chunk and a digest of the encrypted chunk;
- retrieving the Token, from the hash table, based on the RequestID;
- processing the digest using a public key and the Token;
- checking match between processed digest and at least part of the encrypted chunk;
- only in case of match: decrypt encrypted chunk and return the decrypted chunk to the client;
- wherein at least one of receiving, processing, computing decrypting are perfumed by a processor.

11. A system for securing a client's access to a Digital Rights Management (DRM) agent's services, said system being comprised of:
- a microprocessor;
- a client algorithm engine for receiving a decryption request identifier (RequestID) and a token value (Token) from the DRM agent, computing a digest of a multimedia content encrypted chunk using the Token and a private key, computing a decryption request of the multimedia content encrypted chunk, wherein the decryption request comprising the RequestID, the encrypted chunk and the digest of the encrypted chunk, and sending to the DRM agent, the decryption request of the encrypted chunk;
- a get-token request handling engine for receiving a get-token request, applying a function to generate the RequestID and the Token, returning the RequestID and the Token to the client, and inserting, into a hash table of token values with get-token requests identifiers as keys, a record comprising the Token associated to the RequestID;
- a decryption request handling engine for receiving a decryption request of a multimedia content encrypted chunk comprising the RequestID, the encrypted chunk and a digest of the encrypted chunk, retrieving the Token, from the hash table based on the RequestID, processing the digest using a public key and the Token, checking match between processed digest and at least part of the encrypted chunk and, only in case of match: decrypting the encrypted chunk and returning the decrypted chunk to the client.

12. The system of claim 11 wherein:
- the get-token request comprises an identifier ClientID of the client;
- the function uses ClientID as an input;
- the hash table's record further includes ClientID associated with the key RequestID;
- the decryption request further comprises an identifier ClientID2 of the client.

13. The system of claim 11 wherein checking match between processed digest and at least part of encrypted chunk includes performing a XOR operation between Token and the at least part of encrypted chunk.

14. The system of claim 11 wherein, in case of no match, the client application is terminated.

15. The system of claim 11 further comprising means for protecting, in terms of mutual exclusion inside the DRM agent, the hash table management process and the communication process with the client in order to prevent the client to gain access to the hash table.

* * * * *